US006589637B2

(12) United States Patent
Baettig et al.

(10) Patent No.: US 6,589,637 B2
(45) Date of Patent: Jul. 8, 2003

(54) RECORDING SHEETS FOR INK JET PRINTING

(75) Inventors: Kurt Baettig, Le Mouret (CH); Rolf Steiger, Praroman (CH); Karl Peternell, Freiburg (CH)

(73) Assignee: Ilford Imaging Switzerland GmbH (CH)

( * ) Notice: Subject to any disclaimer, the term of this patent is extended or adjusted under 35 U.S.C. 154(b) by 72 days.

(21) Appl. No.: 09/974,642

(22) Filed: Oct. 10, 2001

(65) Prior Publication Data

US 2002/0064634 A1 May 30, 2002

(30) Foreign Application Priority Data

Oct. 11, 2000 (EP) ........................................... 00810941

(51) Int. Cl.[7] ............................ B32B 27/14; B32B 3/00

(52) U.S. Cl. ....................... 428/195; 428/328; 428/331; 428/480; 428/500; 428/524; 428/537.5

(58) Field of Search ................................ 428/195, 328, 428/331, 480, 500, 524, 537.5

(56) References Cited

U.S. PATENT DOCUMENTS

| | | | | | |
|---|---|---|---|---|---|
| 4,003,846 | A | * | 1/1977 | Kuhn et al. | 252/316 |
| 4,009,150 | A | * | 2/1977 | Norling | 260/892 |
| 4,252,698 | A | | 2/1981 | Ito et al. | |
| 4,387,115 | A | * | 6/1983 | Kitamura et al. | 427/58 |
| 4,644,376 | A | * | 2/1987 | Usami et al. | 346/215 |
| 6,093,529 | A | * | 7/2000 | Tsuzuki et al. | 430/619 |
| 6,402,986 | B1 | * | 6/2002 | Jones, II et al. | 252/301.166 |
| 6,447,979 | B1 | * | 9/2002 | Hattori et al. | 430/270.1 |

FOREIGN PATENT DOCUMENTS

| | | |
|---|---|---|
| EP | 0373573 | 6/1990 |
| EP | 0559324 A1 | 9/1993 |
| EP | 0674233 A2 | 9/1995 |
| EP | 0685345 A1 | 12/1996 |
| EP | 0875394 A1 | 11/1998 |
| EP | 0967086 A1 | 12/1999 |
| GB | 2088777 A | 6/1982 |
| JP | 51-11852 | 10/1996 |

OTHER PUBLICATIONS

"Ozone Problem with Epson Photo Paper," Hard Copy Supplies Journal 6(7), 35–36 (2000).

Houben–Weyl, Methoden der organischen Chemie, 4th edition, Georg Thieme Verlag, Stuttgart, vol. 7/2b, pp. 1616–1634 (1976).

* cited by examiner

*Primary Examiner*—Cynthia H. Kelly
*Assistant Examiner*—B. Shewareged
(74) *Attorney, Agent, or Firm*—Dara L. Onofrio, Esq.; Onofrio Law

(57) ABSTRACT

A recording sheet for ink jet printing is described, which consists of a support having coated thereon at least one ink-receiving layer consisting of binders and a porous inorganic oxide, wherein the recording sheet contains tautomeric compounds of formulas Ia (diketo form) and Ib (enol form)

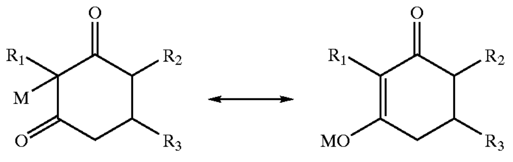

Ia Ib wherein in formula Ib (enol form)

M represents a hydrogen cation, a metal cation, a triethanolamine cation or an ammonium cation optionally substituted by one or more alkyl or substituted alkyl groups each having from 1 to 18 C atoms;

$R_1$ represents hydrogen, alkyl with 1 to 12 C atoms or substituted alkyl with 2 to 6 C atoms, wherein the substituents are selected from the group consisting of CN, COOH, OH and $COOR_4$, where $R_4$ represents alkyl with 1 to 12 C atoms; and $R_2$, $R_3$ independently represent hydrogen, alkyl with 1 to 6 C atoms or substituted alkyl with 2 to 6 C atoms, wherein the substituents are selected from the group consisting of CN, COOH, OH and $COOR_5$, where $R_5$ represents alkyl with 1 to 12 C atoms.

10 Claims, No Drawings

RECORDING SHEETS FOR INK JET PRINTING

FIELD OF THE INVENTION

The invention relates to new stabilizers for recording sheets used in ink jet printing, containing porous inorganic oxides.

BACKGROUND OF THE INVENTION

Ink jet printing processes are mainly of two types: continuous stream and drop-on-demand.

In continuous stream ink jet printing systems, ink is emitted in a continuous stream under pressure through a nozzle. The stream breaks up into droplets at a certain distance from the nozzle. If a specific location on the recording sheet has to be printed the individual droplets are directed to the recording sheet, otherwise they are directed to a gutter. This is done for example by charging unnecessary droplets in accordance with digital data signals and passing them through an electric static field which adjusts the trajectory of these droplets in order to direct them to the gutter. The inverse procedure may also be used wherein uncharged droplets are directed to the gutter.

In the non-continuous process, or the so-called "drop-on-demand" systems, a droplet is generated in accordance with digital data signals only if it is to be placed onto the recording sheet.

The printing speed of modern ink jet printers is always increasing for economical reasons. Recording sheets that are suitable for these printers therefore need to absorb the inks very quickly. Especially suitable are recording sheets containing porous inorganic oxides.

Such recording sheets available today do not meet all of the required demands. In particular, the storage stability of images printed on these recording sheets has to be improved. These images are not particularly stable when they are in contact with ambient air, which normally contains sulfur dioxide and, especially in summer, photochemically generated impurities such as ozone or nitrogen oxides. The images are strongly altered or even destroyed in a short time when they are in contact with ambient air. These phenomena are described for example in Hardcopy Supplies Journal, 6 (7), 35 (2000).

In patent GB 2,088,777 derivatives of phenols and bisphenols are proposed in order to improve the stability of recording sheets containing inorganic oxides.

In patent application EP 0,685,345 the addition of dithiocarbamates, thiocyanates, thiurams or sterically hindered amines to recording sheets containing porous inorganic oxides is proposed in order to improve their stability.

In patent application EP 0,373,573 derivatives of polyhydroxybenzenes are proposed as stabilizers for recording sheets for ink jet printing.

All of these proposed additives only marginally increase the stability of recording sheets for ink jet printing containing porous inorganic oxides when they are in contact with ambient air.

Stabilizing additives for such recording sheets containing porous inorganic oxides need to be sufficiently soluble and compatible with the other ingredients of the mainly aqueous coating compositions. They need to be colorless or are allowed to be colored only slightly. Furthermore, these additives need to be stable when the recording sheets or the images printed thereon are stored over long periods and they are not allowed to yellow. Additionally they need to be non-toxic and inoffensive.

There is therefore an urgent need to improve, in addition to the ink absorption capacity, the image quality, the water fastness, the light stability etc., in particular the storage stability of recording sheets containing porous inorganic oxides when they are in contact with ambient air containing impurities such as ozone, nitrogen oxides or sulfur dioxide.

SUMMARY OF THE INVENTION

An objective of the invention is to provide recording sheets containing porous inorganic oxides with improved storage stability when in contact with ambient air, where images recorded thereon can be observed by both reflected and transmitted light, and consist of a support having coated thereon at least one ink-receiving layer.

We have surprisingly found that the storage stability of recording sheets according to the invention is considerably improved in contact with ambient air when substituted or unsubstituted 1,3-cyclohexanedione is added to the recording sheets. Images printed onto such recording sheets according to our invention show considerably less change of colors and/or dye losses when in contact with ambient air containing impurities such as ozone, nitrogen oxides or sulfur dioxide in comparison with images printed onto recording sheets not containing these compounds.

The recording sheets for ink jet printing according to the invention contain in the coated layers, besides the porous inorganic oxide and the substituted or unsubstituted 1,3-cyclohexanedione, one or more binders. The substituted or unsubstituted 1,3-cyclohexanedione may be added to the layer containing the inorganic porous oxide or to any other layer of the recording sheet.

Preferred additives are 1,3-cyclohexanedione and 2-methyl-1,3-cyclohexanedione.

Further compounds such as reducing agents, organic thio compounds and inorganic thiocyanates may be added to the recording sheets according to the invention.

Additionally a reduction catalyst may be added together with the substituted or unsubstituted 1,3-cyclohexanedione, the reducing agent and the organic thio compounds or inorganic thiocyanates.

The invention will be described in detail in the following description.

DETAILED DESCRIPTION OF THE INVENTION

The invention describes a recording sheet for ink jet printing consisting of a support having coated thereon one or more layers comprising, besides a porous inorganic oxide and binders in the ink-receiving layer, substituted or unsubstituted 1,3-cyclohexanedione. The porous inorganic oxide and the substituted or unsubstituted 1,3-cyclohexanedione may be contained in the same or in different layers.

These 1,3-cyclohexanediones have already been proposed as heat stabilizers or as additives for polyvinyl chloride in order to prevent yellowing in U.S. Pat. No. 4,252,698 or in patent application JP 51-111,852.

An object of the present invention is the addition of tautomeric compounds of formulas Ia (diketo form) and Ib (enol form) to recording sheets for ink jet printing containing a porous inorganic oxide

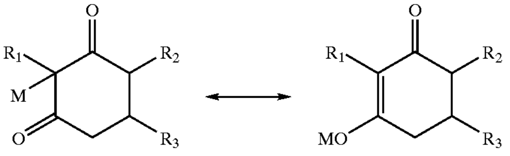

Ia Ib wherein in formula Ib (enol form)

M represents a hydrogen cation, a metal cation such as Li, Na or K, a triethanolamine cation or an ammonium cation optionally substituted by one or more alkyl or substituted alkyl groups each having from 1 to 18 C atoms;

$R_1$ represents hydrogen, alkyl with 1 to 12 C atoms or substituted alkyl with 2 to 6 C atoms, wherein the substituents are selected from the group consisting of CN, COOH, OH and $COOR_4$, where $R_4$ represents alkyl with 1 to 12 C atoms; and $R_2$, $R_3$ independently represent hydrogen, alkyl with 1 to 6 C atoms or substituted alkyl with 2 to 6 C atoms, wherein the substituents are selected from the group consisting of CN, COOH, OH and $COOR_5$, where $R_5$ represents alkyl with 1 to 12 C atoms.

Especially preferred are compounds of formula Ia and Ib, wherein in formula Ib (enol form)

M represents a hydrogen, a Li, a Na, a K, an ammonium or a triethanolamine cation;

$R_1$ represents hydrogen, alkyl with 1 to 3 C atoms or alkyl substituted by $COOR_4$ with 2 to 4 C atoms, where $R_4$ represents alkyl with 1 or 2 C atoms; and $R_2$, $R_3$ independently represent hydrogen, alkyl with 1 or 2 C atoms or alkyl with 2 to 4 C atoms substituted by $COOR_5$, where $R_5$ represents alkyl with 1 or 2 C atoms.

Preferred additives are 1,3-cyclohexanedione and 2-methyl-1,3-cyclohexanedione.

Such a recording sheet contains one or more of these compounds. The quantity is from 1 $mg/m^2$ to 5,000 $mg/m^2$, preferably from 50 $mg/m^2$ to 600 $mg/m^2$ of these compounds.

In addition to the compounds of formulas Ia and Ib reducing agents may be added to the recording sheet as for example ascorbic acid or benzenephosphonic acid.

In addition to the compounds of formulas Ia and Ib organic thio compounds such as thioglycols or thiocarboxylic acids, in particular thiodiethyleneglycol or thiodipropionic acid, or inorganic thiocyanates such as ammonium thiocyanate, may be added.

It is especially preferred if, in addition to the reducing agents, the organic thio compounds or the inorganic thiocyanates, a reduction catalyst such as mandelic acid is added.

Preferably, the compounds of formulas Ia and Ib are used together with phenolic compounds such as 2,6-dihydroxybenzoic acid.

Compounds of formulas Ia and Ib are partly known and in some cases commercially available or they may be prepared by known methods (as described for example in Houben-Weyl, Methoden der organischen Chemie, $4^{th}$ edition, Georg Thieme Editions, Stuttgart, Volume 7/2b, Pages 1617 ff (1976)).

Especially suitable compounds of formulas Ia and Ib are the compounds of formulas (1), (2), (3), (4), (5) and (6)

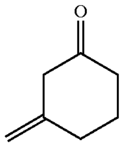

(1)

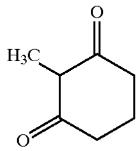

(2)

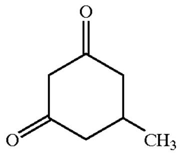

(3)

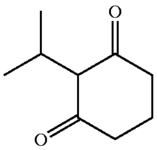

(4)

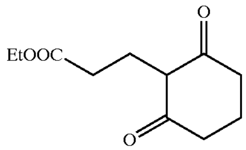

(5)

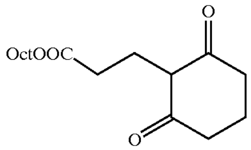

(6)

The additives according to the invention may added to the recording sheets in form of their aqueous, acid solutions or in form of their lithium, sodium or potassium salts, or in form of their salts with triethanolamine or their ammonium salts in neutral or basic solution. The ammonium salt may be substituted.

In the case where these compounds are not sufficiently water-soluble, they may be incorporated into the coating solutions by other common techniques known in the art. The compounds may for example be dissolved or emulsified in a mixture of water and water-soluble or water miscible organic solvents such as lower mono- or bis-alcohols, ketones, esters or amides.

Colloidal silicium dioxide, colloidal aluminium oxide or colloidal aluminium oxide/hydroxide may be used as porous inorganic oxide. Colloidal aluminium oxide or colloidal aluminium oxide/hydroxide are preferred. Especially preferred as colloidal aluminium oxide is $y$-$Al_2O_3$ and as colloidal AlOOH an AlOOH modified with salts of the rare earth metal series as described in patent application EP 0,875,394. This porous aluminium oxide/hydroxide contains one or more elements of the rare earth metal series of the periodic system of the elements with atomic numbers 57 to 71, preferably in a quantity from 0.4 to 2.5 mole percent relative to $Al_2O_3$. Especially preferred as aluminium oxide/hydroxide is pseudo-bohemite, an agglomerate of aluminium oxide/hydroxide of formula $Al_2O_3 \cdot n\ H_2O$ where n is from 1 to 1.5, or pseudo-bohemite modified with the salts of the rare earth metal series as also described in patent application EP 0,875,394. This porous pseudo-bohemite contains one or more elements of the rare earth metal series of the periodic system of the elements with atomic numbers 57 to 71, preferably in a quantity from 0.4 to 2.5 mole percent relative to $Al_2O_3$.

The binders are in most cases water-soluble polymers. Especially preferred are film forming polymers.

The water soluble polymers include for example natural polymers or modified products thereof such as albumin, gelatin, casein, starch, gum arabicum, sodium or potassium alginate, hydroxyethyl cellulose, carboxymethyl cellulose, α-, β- or γ-cyclodextrine and the like. In the case where one of the water-soluble polymers is gelatin, all known types of gelatin may be used as for example acid pigskin or limed bone gelatin, acid or base hydrolyzed gelatin, but also derivatised gelatins like for instance phthalaoylated, acetylated or carbamoylated gelatin or gelatin derivatised with the anhydride of trimellytic acid.

A preferred natural binder is gelatin.

Synthetic binders may also be used and include for example polyvinyl alcohol, polyvinyl pyrrolidone, completely or partially saponified products of copolymers of vinyl acetate and other monomers; homopolymers or copolymers of unsaturated carboxylic acids such as (meth) acrylic acid, maleic acid, crotonic acid and the like; homopolymers or copolymers of sulfonated vinyl monomers such as vinylsulfonic acid, styrene sulfonic acid and the like. Furthermore homopolymers or copolymers of vinyl monomers of (meth)acrylamide; homopolymers or copolymers of other monomers with ethylene oxide; polyurethanes; polyacrylamides; water soluble nylon type polymers; polyesters; polyvinyl lactams; acrylamide polymers; substituted polyvinyl alcohol; polyvinyl acetals; polymers of alkyl and sulfoalkyl acrylates and methacrylates; hydrolyzed polyvinyl acetates; polyamides; polyvinyl pyridines; polyacrylic acid; copolymers with maleic anhydride; polyalkylene oxides; methacrylamide copolymers and maleic acid copolymers may be used. All these polymers may also be used as mixtures.

Preferred synthetic binders are polyvinyl alcohol and polyvinyl pyrrolidone or mixtures thereof.

These polymers may be blended with water insoluble natural or synthetic high molecular weight compounds, particularly with acrylate latices or with styrene acrylate latices.

Although not specifically claimed in this invention water insoluble polymers are nevertheless considered part of the system.

The polymers mentioned above having groups with the possibility to react with a cross-linking agent can be cross-linked or hardened to form essentially water insoluble layers. Such cross-linking bonds may be either covalent or ionic. Cross-linking or hardening of the layers allows for the modification of the physical properties of the layers, like for instance in water absorption of the layer or in resistance against layer damage.

The cross-linking agents or hardeners are selected depending on the type of the water-soluble polymers used.

Organic cross-linking agents and hardeners include for example aldehydes (such as formaldehyde, glyoxal or glutaraldehyde), N-methylol compounds (such as dimethylol urea or methylol dimethylhydantoin), dioxanes (such as 2,3-dihydroxydioxane), reactive vinyl compounds (such as 1,3,5-trisacrylolyl hexahydro-s-triazine or bis-(vinylsulfonyl)methyl ether), reactive halogen compounds (such as 2,4-dichloro-6-hydroxy-s-triazine), epoxides, aziridines, carbamoyl pyridinium compounds or mixtures of two or more of the above mentioned cross-linking agents.

Inorganic cross-linking agents or hardeners include for example chromium alum, aluminium alum or boric acid.

The layers may also contain reactive substances that cross-link the layers under the influence of ultraviolet light, electron beams, X-rays or heat.

The layers may be modified by the addition of fillers. Possible fillers are for instance kaolin, Ca- or Ba-carbonates, silicium dioxide, titanium dioxide, bentonites, zeolites, aluminium silicate, calcium silicate or colloidal silicium dioxide. Likewise, the possibility exists to use organic inert particles such as polymer beads. These beads may consist of polyacrylates, polyacrylamides, polystyrene or different copolymers of acrylates and styrene. The fillers are selected according to the intended use of the printed images. Some of these compounds cannot be used if the printed images are to be used as transparencies. However they are of interest in cases where the printed images are be to used as remission pictures. Very often, the introduction of such fillers causes a wanted matte surface.

The recording sheets may further contain in addition water-soluble metal salts, as for example salts of the alkaline earths or salts of the rare earth metal series.

The recording sheets according to the invention comprise a support having coated thereon at least one ink-receiving layer, and, optionally, auxiliary layers.

A wide variety of supports are known and commonly used in the art. They include all those supports used in the manufacture of photographic materials. This includes clear films made from cellulose esters such as cellulose triacetate, cellulose acetate, cellulose propionate or cellulose acetate/butyrate, polyesters such as polyethylene terephthalate or polyethylene naphthalate, polyamides, polycarbonates, polyimides, polyolefins, polyvinyl acetals, polyethers, polyvinyl chloride and polyvinylsulfones. Polyester film supports, and especially polyethylene terephthalate or polyethylene naphthalate are preferred because of their excellent dimensional stability characteristics. The usual supports used in the manufacture of opaque photographic materials may be used including for example baryta paper, polyolefin coated papers, voided polyester as for instance manufactured by DuPont under the trade name of Melinex®. Especially preferred are resin-coated paper or voided polyester.

When such support materials, in particular polyester, are used, a subbing layer is advantageously coated first to improve the bonding of the ink-receiving layers to the support. Useful subbing compositions for this purpose are well known in the photographic industry and include for example terpolymers of vinylidene chloride, acrylonitrile and acrylic acid or of vinylidene chloride, methyl acrylate and itaconic acid.

Also used as supports are plain paper, comprising all different types of papers varying widely in their composition and in their properties. Pigmented papers and cast-coated papers may also be used, as well as metal foils, such as foils made from aluminium.

The layers may also be coated onto textile fiber materials consisting of polyamides, polyesters, cotton, viscose, or wool.

The additive according to the invention may be added to any layer of the recording sheet.

The ink-receiving layers according to the invention are in general coated from aqueous solutions or dispersions containing all necessary ingredients. In many cases, surfactants are added to those coating solutions in order to improve the coating behavior and the evenness of the layers. Besides being necessary for coating purposes, these compounds may have an influence on the image quality and may therefore be selected with this specific goal in mind. Although not specifically claimed in this invention surfactants nevertheless form an important part of the invention.

In addition to the above mentioned compounds recording sheets according to the invention may contain additional compounds aimed at further improving their performance, as for example brightening agents to improve the whiteness, such as stilbenes, coumarines, triazines, oxazoles or others compounds known to someone skilled in the art.

Light stability can be improved by adding UV absorbers such as 2-hydroxybenzotriazoles, 2-hydroxybenzophenones, triazine derivatives or derivatives of cinnamic acids. The amount of UV absorber may vary from 200 mg/$m^2$ to 2000 mg/$m^2$, preferably from 400 mg/$m^2$ to 1000 mg/$m^2$. The UV absorber may be added to any of the layers of the recording sheet according to the invention. It is preferred however, if it is added, it should be added to the topmost layer.

It is further known that images produced by ink jet printing may be protected from degradation by the addition of radical scavengers, stabilizers, reducing agents and antioxidants. Examples of such compounds are sterically hindered phenols, sterically hindered amines, chromanols, ascorbic acid, phosphinic acid and its derivatives, sulfur containing compounds such as sulfides, mercaptans, thiocyanates, thioamides or thioureas.

The above-mentioned additives may be added as aqueous solutions to the coating solutions. In the case where these compounds are not sufficiently water-soluble, they may be incorporated into the coating solutions by other common techniques known in the art. The compounds may for example be dissolved in a water miscible solvent such as lower alcohols, glycols, ketones, esters, or amides. Alternatively, the compounds may be added to the coating solutions as fine dispersions, as oil emulsions, as cyclodextrine inclusion compounds or incorporated into latex particles.

Typically, the recording sheet according to the invention has a thickness in the range of 0.5 $\mu$m to 100 $\mu$m dry thickness, preferably in the range of 5 $\mu$m to 50 $\mu$m dry thickness.

The coating solutions may be coated onto the support by any number of suitable procedures. Usual coating methods include for example extrusion coating, air knife coating, doctor blade coating, cascade coating, or curtain coating. The coating solutions may also be applied using spray techniques. The ink-receiving layers may be built up from several single layers that can be coated one after the other or simultaneously. It is likewise possible to coat a support on both sides with ink-receiving layers. It is also possible to coat an antistatic layer or an anticurl layer on the backside. The selected coating method however is not to be considered limiting for the present invention.

It is also possible to immerse a recording sheet in a solution of the unsubstituted or substituted 1,3-cyclohexanedione in order to add the unsubstituted or substituted 1,3-cyclohexanedione to the recording sheet.

Inks for ink jet printing consist in essence of a liquid vehicle and a dye or pigment dissolved or suspended therein. The liquid vehicle for ink jet inks consists in general of water or a mixture of water and a water miscible organic solvent such as ethylene glycol, higher molecular weight glycols, glycerol, dipropylene glycol, polyethylene glycol, amides, polyvinyl pyrrolidone, N-methylpyrrolidone, cyclohexylpyrrolidone, carboxylic acids and their esters, ethers, alcohols, organic sulfoxides, sulfolane, dimethylformamide, dimethylsulfoxide, cellosolve, polyurethanes, acrylates and the like.

The non-aqueous parts of the ink generally serve as humefactants, cosolvents, viscosity regulating agents, ink penetration additives or drying agents. The organic compounds have in most cases a boiling point, which is higher than that of water. In addition, aqueous inks used for printers of the continuous stream type may contain inorganic or organic salts to increase their conductivity. Examples of such salts include nitrates, chlorides, phosphates, and salts of water-soluble organic acids such as acetates, oxalates, and citrates. The dyes and pigments suitable for the preparation of inks useable with the recording sheets according to the invention cover practically all classes of known coloring compounds. Dyes or pigments typically used for this purpose are described in patent application EP 0,559,324. The recording sheets according to this invention are meant to be used in conjunction with most of the inks representing the state of the art.

Other additives present in inks are for instance surfactants, optical brighteners, UV absorbers, light stabilizers, biocides, precipitating agents such as multivalent metal compounds and polymeric additives.

This description of inks is for illustration only and is not to be considered as limiting for the purpose of the invention.

The present invention will be illustrated in more detail by the following examples without limiting the scope of the invention in any way.

EXAMPLES

Example 1 (Comparison)

Preparation of the Coating Solution 19.0 g of Disperal® (aluminium oxide/hydroxide, available from CONDEA GmbH, Hamburg, Germany) were dispersed at a temperature of 40° C. in 51 g of aqueous lactic acid (0.67%). Afterwards, 17.1 g of a solution of polyvinyl alcohol (10%, hydrolysis degree 98–99%, molecular weight 85,000 to 146,000, available from ALDRICH Chemie, Buchs, Switzerland) were added. Finally, the total weight was adjusted to 100 g with deionised water, and the solution was exposed to ultrasound for three minutes.

Coating 150 g/$m^2$ of this coating solution were coated at a temperature of 40° C. onto a polyethylene coated paper support. The coated support was then dried for 60 minutes at a temperature of 30° C. 1 $m^2$ of the coated support contains, in addition to the other coating ingredients, 22.2 g of inorganic oxides, calculated as $Al_2O_3$, and 2.56 g of polyvinyl alcohol.

Examples 2–12

Preparation of the Additive Solutions (Table 1)

100 g of each solution were prepared by dissolving the compound or the mixture of compounds in a suitable solvent and subsequent filtering of the resulting solution. In the case of solvent mixtures, the ratio of the different compounds is by weight.

TABLE 1

| Example | Compound(s) | Quantity (g) | Solvent |
|---|---|---|---|
| 2 | 1,3-Cyclohexanedione | 5.0 | Water/Methanol 3:1 |
| 3 | 2-Methyl-1,3- | 5.0 | Water/Methanol 1:2 |

TABLE 1-continued

| Example | Compound(s) | Quantity (g) | Solvent |
|---|---|---|---|
| | cyclohexanedione | | |
| 4 | 1,3-Cyclohexandione | 2.5 | Water/Methanol 1:2 |
| | 2-Methyl-1,3-cyclohexanedione | 2.5 | |
| 5 | 1,3-Cyclohexanedione | 5.0 | Water/Methanol 3:1 |
| | Ascorbic acid | 5.0 | |
| 6 | 1,3-Cyclohexanedione | 5.0 | Water/Methanol 3:1 |
| | Ascorbic Acid | 5.0 | |
| | Mandelic acid | 2.0 | |
| 7 | 1,3-Cyclohexanedione | 5.0 | Water/Methanol 3:1 |
| | Thiodiethyleneglycol | 5.0 | |
| 8 | 1,3-Cyclohexanedione | 5.0 | Water/Methanol 3:1 |
| | Thiodiethyleneglycol | 5.0 | |
| | Mandelic acid | 2.0 | |
| 9 | 1,3-Cyclohexanedione | 5.0 | Water/Methanol 1:1 |
| | Thiodipropionic acid | 5.0 | |
| 10 | 1,3-Cyclohexanedione | 5.0 | Water/Methanol 3:1 |
| | Benzenephosphinic acid | 5.0 | |
| 11 | 1,3-Cyclohexanedione | 5.0 | Water/Methanol 3:1 |
| | Ammonium thiocyanate | 1.0 | |
| 12 | 1,3-Cyclohexanedione | 5.0 | Water/Methanol 3:1 |
| | Benzenephosphinic acid | 5.0 | |
| | Mandelic acid | 2.0 | |

1,3-Cyclohexanedione and 2-methyl-1,3-cyclohexanedione are available from Acros Organics, Geel, Belgium. Ascorbic acid, mandelic acid, thiodiethyleneglycol, thiodipropionic acid, benzenephosphinic acid, 2,6-dihydroxybenzoic acid, and ammonium thiocyanate are available from Fluka Chemie AG, Buchs, Switzerland.

Preparation of the Coating Solutions

For each solution, 19.0 g of Disperal® were dispersed at a temperature of 40° C. in 51 g of aqueous lactic acid (0.67%) and 2.7 g of the corresponding additive solution. Afterwards, 17.1 g of a solution of polyvinyl alcohol (10%) were added, the total weight was adjusted to 100 g with deionised water, and the solution was exposed to ultrasound for three minutes.

Coating 150 g/m$^2$ of each of these coating solutions were coated at a temperature of 40° C. onto a polyethylene coated paper support. The coated support was then dried for 60 minutes at a temperature of 30° C. 1 m$^2$ of the coated support contains, in addition to the other coating ingredients, 22.2 g of inorganic oxides, calculated as $Al_2O_3$, and 2.56 g of polyvinyl alcohol.

Example 13

Preparation of the Additive Solution 100 g of the additive solution of N,N-dimethyldithiocarbamic acid solution were prepared by dissolving 5.0 g of the sodium salt of N,N-dimethyldithiocarbamic acid (available from Fluka Chemie AG, Buchs, Switzerland) in 95 g of water and subsequent filtering of the resulting solution.

Preparation of the Coating Solution 19.0 g of Disperal® were dispersed at a temperature of 40° C. in 51 g of aqueous lactic acid (0.67%) and 2.7 g of the solution of N,N-dimethyldithiocarbamic acid. Afterwards, 17.1 g of a solution of polyvinyl alcohol (10%) were added, the total weight was adjusted to 100 g with deionised water, and the solution was exposed to ultrasound for three minutes.

Coating 150 g/m$^2$ of this coating solution were coated at a temperature of 40° C. onto a polyethylene coated paper support.

The coated support was then dried for 60 minutes at a temperature of 30° C. 1 m$^2$ of the coated support contains, in addition to the other coating ingredients, 22.2 g of inorganic oxides, calculated as $Al_2O_3$, and 2.56 g of polyvinyl alcohol.

Coatings with other additives mentioned in the relevant documents of the state of the art, namely 2,6-di-tert-butyl-4-methyl-phenol (Patent GB 2,088,777), sodium thiocyanate (Patent application EP 0,685,345) and 3,4-dimethoxybenzoic acid (Patent application EP 0,373,573) could not be prepared, because coating solutions containing these compounds showed precipitation or extremely high viscosities.

Example 14

Preparation of an Aqueous Dispersion of Positively Charged $SiO_2$ 25 g of Aerosil 200 (available from Degussa AG, Frankfurt/Main, Germany) were dissolved under exposure to ultrasound at a temperature of 25° C. in 60 g of aqueous lactic acid (0.67%). Afterwards 6.85 g of an aqueous solution of aluminium chlorohydrate (47.7%, prepared from aluminium chlorohydrate of formula $Al_2(OH)_5Cl \cdot 2.5\ H_2O$, available as Locron from Clariant AG, Muttenz, Switzerland) were added and the resulting solution was stirred for 3 hours. Finally, 6.5 g of a solution of potassium hydroxide (10%) were added and the total weight was adjusted to 100 g Preparation of the Coating Solution 48 g of this aqueous dispersion of positively charged $SiO_2$ were diluted under stirring at a temperature of 40° C. with 8 g of water and mixed with 23.4 g of a solution of polyvinyl alcohol (10%). The total weight was adjusted to 100 g with deionised water and the solution was exposed to ultrasound.

Coating 100 g/m$^2$ of this coating solution were coated at a temperature of 40° C. onto a polyethylene coated paper support. The coated support was then dried for 60 minutes at a temperature of 30° C. 1 m$^2$ of the coated support contains, in addition to the other coating ingredients, 12 g of positively charged $SiO_2$ and 2.8 g of polyvinyl alcohol.

Examples 15–17

Preparation of the Coating Solutions

For each coating solution, 48 g of the aqueous dispersion of positively charged $SiO_2$ of Example 14 were mixed at a temperature of 40° C. with 27.6 g of a solution of polyvinyl alcohol (10%) and 4 g of the corresponding additive solution (Additive solution of Example 2 for Example 15; additive solution of Example 3 for Example 16 and additive solution of Example 4 for Example 17). The total weight of each solution was adjusted to 100 g with deionised water and the solutions were exposed to ultrasound.

Coatings 100 g/m$^2$ of each of these coating solutions were coated at a temperature of 40° C. onto a polyethylene coated paper support. The coated support was then dried for 60 minutes at a temperature of 30° C. 1 m$^2$ of the coated supports contain, in addition to the other coating ingredients, 12 g of positively charged $SiO_2$ and 2.8 g of polyvinyl alcohol.

Example 18 (Comparison)

Preparation of an Aqueous Dispersion of Positively Charged $SiO_2$ 40 g of Aerosil 200 were dispersed under exposure to ultrasound at a temperature of 20° C. in 141.6 g of aqueous lactic acid (1%). Afterwards 6.57 g of aluminium chlorohydrate of formula $Al_2(OH)_5Cl \cdot 2.5\ H_2O$ were added and the resulting solution was stirred for 3 hours at a temperature of 20° C. Finally, 8.8 g of a solution of potassium hydroxide (10%) were added under vigorous stirring and the total weight was adjusted 30 minutes later to 200 g. The solution contains 20 weight percent of positively charged $SiO_2$.

Preparation of lanthanum Doped aluminium oxide/hydroxide (2.2 Mole Percent Relative to $Al_2O_3$)

50 g of aluminium oxide/hydroxide Disperal® were dispersed under vigorous mechanical stirring at a temperature of 20° C. for 15 minutes in 948 g of bidistilled water. Then temperature was increased to 90° C. and stirring was continued at this temperature for 15 minutes. Afterwards 2.04 g of $LaCl_3$ (available from Fluka Chemie AG, Buchs, Switzerland) were added as a solid and stirring was continued for 120 minutes. The solid was filtered off, washed three times with bidistilled water, and dried at a temperature of 110° C.

Preparation of the Coating Solution for the Lower Layer 19.76 g of the solid prepared and dried as described above were added under stirring at a temperature of 40° C. to a mixture of 52.38 g of deionised water and 0.38 g of aqueous lactic acid (90%). Afterwards 17.8 g of a solution of polyvinyl alcohol (10%) were added, the solution was exposed to ultrasound and the total weight was adjusted to 100 g with deionised water.

Preparation of the Coating Solution for the Upper Layer 18.4 g of a solution of polyvinyl alcohol (10%) were added to 40 g of this aqueous dispersion of positively charged $SiO_2$. The total weight of the solution was adjusted to 100 g with deionised water.

Coating 263.2 g/m$^2$ of the coating solution for the lower layer were coated at a temperature of 40° C. onto a transparent polyester support. The coated support was then dried for 60 minutes at a temperature of 30° C.

24.0 g/m$^2$ of the coating solution for the upper layer were coated at a temperature of 40° C. onto this transparent polyester support already coated with the lower layer. The coated support was then dried for 60 minutes at a temperature of 30° C.

1 m$^2$ of the coated supports contains, in addition to the other coating ingredients, 50 g of aluminium oxide/hydroxide doped with lanthanum (2.2 mole percent relative to $Al_2O_3$), 1.92 g of positively charged $SiO_2$ and 5.13 g of polyvinyl alcohol.

Example 19

Preparation of the Coating Solution for the Upper Layer 1.15 g of 1,3-cyclohexanedione were added under vigorous stirring at a temperature of 40° C. to 40 g of the aqueous dispersion of positively charged $SiO_2$ of Example 18. Afterwards 18.4 g of a solution of polyvinyl alcohol (10%) were added and the total weight of the solution was adjusted to 100 g with deionised water.

Preparation of the Coating Solution for the Lower Layer and Coating

The coating solution for the lower layer and the coating were prepared as described in Example 18.

The following method was used for the determination of the stability of the prepared recording sheets in contact with ambient air:

Patches of three color black were printed onto these recording sheets according to the invention with an ink jet printer EPSON STYLUST™ COLOR 750 in transparent mode (720 dpi) using original inks.

The printed samples were exposed unsealed on a table for two weeks under normal daylight conditions (1000 lux to 2000 lux) to ambient air under moderate air circulation.

The density loss was measured with an X-Rite® densitometer. It is expressed as percent loss of initial density of three color black of 50% maximum density measured in the red channel.

Results

The density losses obtained under these conditions are listed in Table 2 for recording sheets according to the invention containing the porous inorganic aluminium oxide/hydroxide Disperal®.

TABLE 2

| Example | Yellowing | Dye density loss in % |
|---|---|---|
| 1 | no | 36 |
| 2 | no | 6 |
| 3 | no | 22 |
| 4 | no | 12 |
| 5 | no | 8 |
| 6 | no | 9 |
| 7 | no | 5 |
| 8 | no | 6 |
| 9 | slight | 6 |
| 10 | no | 8 |
| 11 | no | 8 |
| 12 | no | 6 |
| 13 | no | 28 |

The results in Table 2 immediately show that recording sheets for ink jet printing containing the porous inorganic aluminum oxide/hydroxide Disperal® and the additives according to the invention (Examples 2–12) show much lower density losses in the red channel (heavy destruction of the cyan dye coupled with a color change of black patches from black to brown-orange) than a corresponding recording sheet not containing an additive (Example 1) or containing an additive that is state of the art (Example 13). The recording sheets according to the invention do not show yellowing or only to a very slight extent.

The density losses obtained under these conditions are listed in Table 3 for recording sheets according to the invention containing positively charged $SiO_2$.

TABLE 3

| Example | Yellowing | Dye density loss in % |
|---|---|---|
| 14 | no | 21 |
| 15 | no | 12 |
| 16 | no | 16 |
| 17 | no | 17 |

The results in Table 3 immediately show that recording sheets for ink jet printing containing positively charged $SiO_2$ and the additives according to the invention (Examples 15–17) show lower density losses in the red channel (heavy destruction of the cyan dye coupled with a color change of black patches from black to brown-orange) than a corresponding recording sheet not containing an additive (Example 14). The recording sheets according to the invention do not show yellowing.

The density losses obtained under these conditions are listed in Table 4 for recording sheets according to the invention containing lanthanum doped aluminium oxide/hydroxide as well as positively charged $SiO_2$.

TABLE 4

| Example | Yellowing | Dye density loss in % |
|---|---|---|
| 18 | no | 48 |
| 19 | no | 11 |

The results in Table 4 immediately show that the recording sheet for ink jet printing containing lanthanum doped aluminium oxide/hydroxide as well as positively charged $SiO_2$ and the additive 1,3-cyclohexanedione according to the invention (Example 19) shows much lower density losses in the red channel than a corresponding recording sheet not containing such an additive (Example 18). The recording sheet according to the invention did not show any yellowing.

The foregoing description of various and preferred embodiments of the present invention has been provided for purposes of illustration only, and it is understood that numerous modifications, variations and alterations may be made without departing from the scope and spirit of the invention as defined in the claims appended hereto.

What is claimed is:

1. Recording sheet for ink jet printing, having coated onto a support at least one ink-receiving layer comprising binders and an inorganic porous oxide, wherein that recording sheet contains tautomeric compounds of formulas Ia (diketo form) and Ib (enol form)

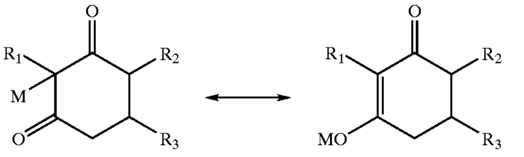

Ia Ib wherein in

M represents a hydrogen cation, a metal cation, a triethanolamine cation or an ammonium cation optionally substituted by one or more alkyl or substituted alkyl groups each having from 1 to 18 C atoms;

$R_1$ represents hydrogen, alkyl with 1 to 12 C atoms or substituted alkyl with 2 to 6 C atoms, wherein the substituents are selected from the group consisting of CN, COOH, OH and $COOR_4$, where $R_4$ represents alkyl with 1 to 12 C atoms; and $R_2$, $R_3$ independently represent hydrogen, alkyl with 1 to 6 C atoms or substituted alkyl with 2 to 6 C atoms, wherein the substituents are selected from the group consisting of CN, COOH, OH and $COOR_5$, where $R_5$ represents alkyl with 1 to 12 C atoms.

2. Recording sheet according to claim 1, wherein

M represents a hydrogen, a Li, a Na, a K, an ammonium or a triethanolamine cation;

$R_1$ represents hydrogen, alkyl with 1 to 3 C atoms or alkyl substituted by $COOR_4$ with 2 to 4 C atoms, where $R_4$ represents alkyl with 1 or 2 C atoms; and $R_2$, $R_3$ independently represent hydrogen, alkyl with 1 or 2 C atoms or alkyl with 2 to 4 C atoms substituted by $COOR_5$, where $R_5$ represents alkyl with 1 or 2 C atoms.

3. Recording sheet according to claim 1, wherein

M represents a hydrogen cation;

$R_1$ represents hydrogen or methyl; and $R_2$, $R_3$ represent hydrogen.

4. Recording sheet according to claim 1, wherein that recording sheet contains in addition reducing agents, phenolic compounds, organic thio compounds or inorganic thiocyanates.

5. Recording sheet according to claim 4, wherein that recording sheet contains in addition a reduction catalyst.

6. Recording sheet according to claim 1, wherein the porous inorganic oxide is colloidal aluminium oxide, colloidal aluminium oxide/hydroxide or positively charged silicium dioxide.

7. Recording sheet according to claim 6, wherein the porous inorganic oxide is colloidal $\gamma$-$Al_2O_3$ or pseudo-boehmite.

8. Recording sheet according to claim 7, characterized in that the porous inorganic oxide is AlOOH or pseudo-boehmite comprising one or more of the elements of the rare earth metal series of the periodic system of the elements with atomic numbers 57 to 71 in an amount of from 0.4 to 2.5 mole percent relative to $Al_2O_3$.

9. Recording sheet according to claim 1, wherein the binder is selected from gelatin, polyvinyl alcohol and polyvinyl pyrrolidone or mixtures thereof.

10. Recording sheet according to claim 1, wherein the support is selected from coated or uncoated paper, transparent or opaque polyester or fibrous textile materials.

* * * * *

UNITED STATES PATENT AND TRADEMARK OFFICE

CERTIFICATE OF CORRECTION

PATENT NO. : 6,589,637 B2
DATED : July 8, 2003
INVENTOR(S) : Baettig et al.

It is certified that error appears in the above-identified patent and that said Letters Patent is hereby corrected as shown below:

Column 11,
Line 63, delete “STYLUST™” and insert -- STYLUS™ --.

Signed and Sealed this

Second Day of December, 2003

JAMES E. ROGAN
*Director of the United States Patent and Trademark Office*